United States Patent [19]

Hess et al.

[11] 3,864,254

[45] Feb. 4, 1975

[54] SEWAGE TREATMENT UNIT

[75] Inventors: Howard V. Hess, Glenham; William F. Franz, Gardiner; Edward L. Cole, Fishkill, all of N.Y.

[73] Assignee: Texaco Inc., New York, N.Y.

[22] Filed: Mar. 28, 1973

[21] Appl. No.: 345,637

[52] U.S. Cl. .................. 210/63, 201/2.5, 210/10, 210/66, 210/71
[51] Int. Cl. .................. C02b 1/02, C02b 3/08
[58] Field of Search ............ 210/10, 15, 18, 62, 63, 210/71, 72, 97, 152, 181, 192, 195, 197, 199, 206, 209, 73; 201/2.5, 25

[56] References Cited
UNITED STATES PATENTS

| | | | |
|---|---|---|---|
| 2,041,584 | 5/1936 | Adler | 210/63 UX |
| 2,070,856 | 2/1937 | Butterfield | 210/63 X |
| 3,359,200 | 12/1967 | Gitchel et al. | 210/10 X |
| 3,472,390 | 10/1969 | Pall et al. | 210/152 X |
| 3,671,403 | 6/1972 | Hess et al. | 210/63 X |

OTHER PUBLICATIONS

Physicochemical Process–For water Quality Control, Weber, 1972, pp. 363–366, John Wiley and Sons, Inc.

*Primary Examiner*—Samih N. Zaharna
*Assistant Examiner*—Robert H. Spitzer
*Attorney, Agent, or Firm*—T. H. Whaley; C. G. Ries

[57] ABSTRACT

A sewage treatment unit for the disposal of aqueous waste sewage from a small installation such as a service station includes a primary settling zone receiving the sewage and separating raw sludge from the water. A first pump conveys the water to a storage zone and actuates a second pump which meters in hydrogen peroxide from a supply thereof into the storage zone to reduce the COD of the water. A pump forces the settled sludge to a coking zone where it is coked in the liquid phase. The coke thus formed then passes to a pressure settling device where it is separated from the coking effluent which is recycled to the storage zone.

2 Claims, 1 Drawing Figure

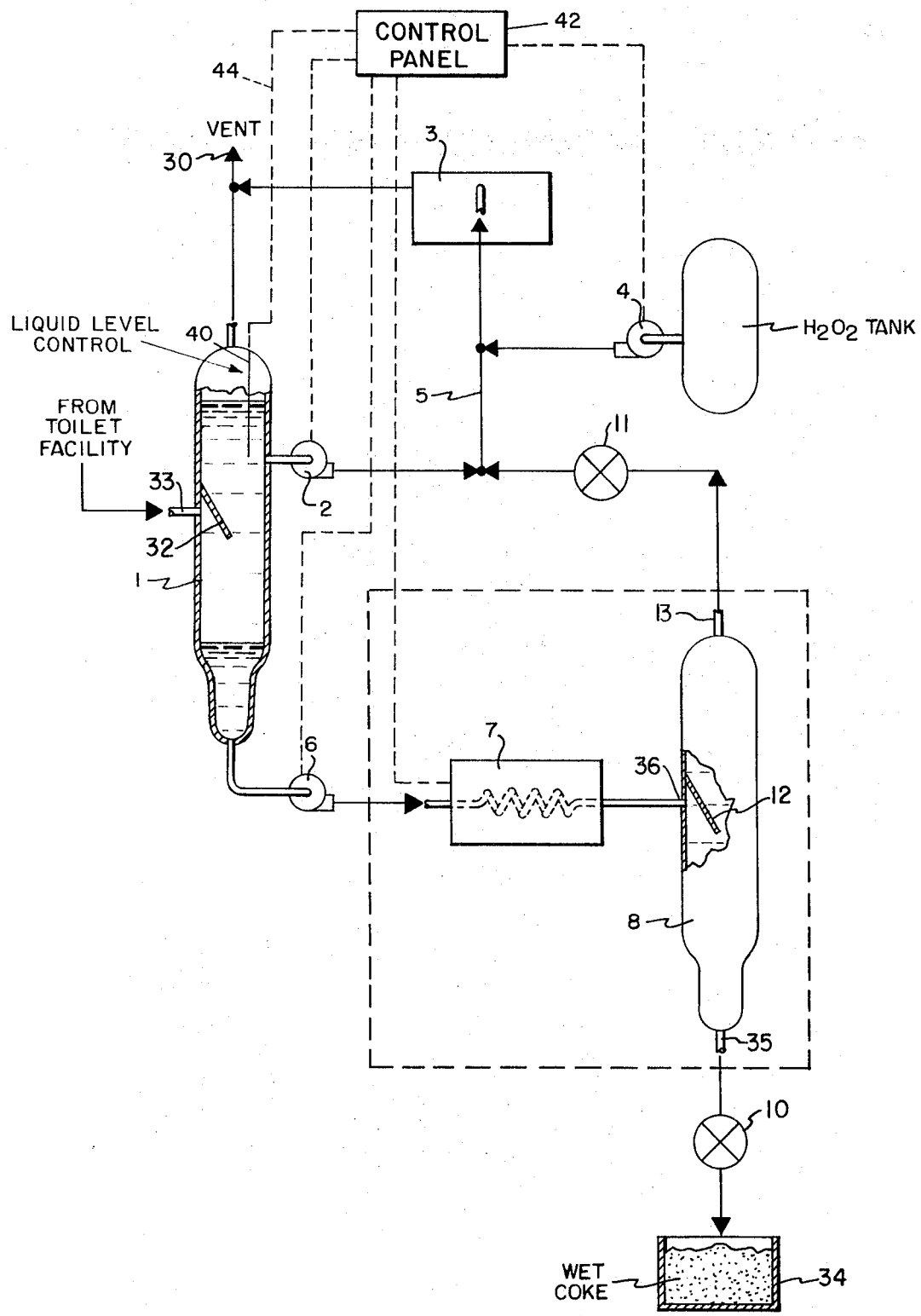

SEWAGE TREATMENT UNIT

This invention relates to the art of sewage treatment as well as to the equipment employed in an effort to obtain the most satisfactory results.

The invention is concerned particularly and specifically with a compact sewage treatment unit employing water recycle, liquid phase coking and the use of hydrogen peroxide. The unit is particularly designed for small installations in areas not readily served by municipal type sewage systems such as gas stations.

The main object of this invention is to provide a unit of the type above described.

This and other objects of the present invention will be apparent from the following description taken in conjunction with the accompanying drawing which is a schematic representation of a preferred form of the invention adapted for use in a gas station.

Briefly stated, the unit of the invention comprises a first primary settling zone for receiving liquid sewage and separating liquid from the settling zone, synchronous means for pumping liquid from the settling zone to a water treating zone and for pumping hydrogen peroxide from a supply thereof to the second zone, a liquid phase coking device; means for bringing solid waste from the first zone to the coking device, a separating zone communication with the coking zone for separating coke from coking effluent and conduit meand for recycling coking effluent to the water treating zone. The single figure of the drawing accompanying this specification shows diagrammatically an installation embodying the features of this invention.

With continued reference to the drawing, waste water from toilet facilities of a gas station including that from urinals, toilets, and wash basins flows by gravity into a vented tank 1 having a vent 30 located above the gas station building. Tank 1 is essentially the equivalent of a primary settler in a conventional sewage plant.

Vessel 1 separates the toilet facility waste into a raw primary sludge layer at the bottom and a water layer essentially free from suspended solids. As shown, vessel 1 has a baffle 32 mounted therein at about a 45° angle to its lower inner side just above sewage inlet 33 to prevent upflow of solids. Pump 2 is on level control and periodically pumps water from tank 1 to storage tank 3 which is located on the roof of the station. When pump 2 is activated by level control, pump 4 is also activated by the same level control and meters in hydrogen peroxide solution (50 to 70% $H_2O_2$) into line 5 in an amount sufficient to handle the chemical oxygen demand of the water from tank 1. This hydrogen peroxide addition serves to oxidize oxidizable dissolved organic materials, control odor, and bleach to a water white color. The water flows through line 5 to recycle water storage tank 3. The purified water is recycled to the toilet facilities by conduits (not shown).

The settled sludge layer, periodically, (on time cycle control) is pumped up to system pressure (500 to 3000 psig) by pump 6 and then passes through electrical heater 7. Heater 7 is designed to have the capacity to heat the sludge to between 550°F. and 750°F. and is of sufficient size to allow a one minute residence time in the heater. The coked sludge then passed to a pressure settler 8 where the coke settles rapidly and may be withdrawn periodically as wet coke through outlet 35 into a suitable container 34 by pressure blow down in reducing valve 10. The liquid from the top of settler 8 passes through a pressure reducing valve 11 into line 5 into vessel 3. Vessel 8 has a baffle 12 mounted therein at about 45° to its inner lower wall above effluent inlet 36 to prevent upward flow of coke. As the coker effluent stream passes through outlet 13 to line 5, the hydrogen peroxide solution pump is activated on time cycle control to meter sufficient $H_2O_2$ to take care of the COD of coker effluent stream.

The synchronous means for pumping liquid from the settling zone, the water treating zone and for supplying $H_2O_2$ are known in the art and operate as follows.

The liquid level control 40 in vessel 1 is activated by the clear water level in 1. As a result, a signal (electrical) is sent to control panel 42 over line 42. The signal starts pumps 2 and 4 which start pumping clear liquid and $H_2O_2$. Once the level in vessel 1 is reduced to its lower level, the level control actuated signals that shut down pumps 2 and 4. The pump 6 and electrical heater 7 are activated on a time cycle, e.g. 15 minutes each 24 hours. Sludge is pumped from vessel 1 by 6 through heater 7 into settling chamber 8. As the result of pressure generated by pump 6 in vessel 8, back pressure regulator 11 is opened and liquid is fed into line 5. When pump 6 is started, pump 4 is also activated and $H_2O_2$ is pumped into line 5. Wet coke from container 8 is let down through reducing valve 10 by hand operating once each 24 hours. The wet coke rejected is a sterile, nonputrescible, material with low odor and can suitably be used as land fill or soil conditioner.

For a typical small station, the waste water from its toilet facilities (urinals, toilets, and wash basins) usually is about 140 gal. per day or roughly 1000 gal/week. The water for the wash basins should be fresh water and not recycled water. This requires that vessel 1 in the flow diagram be a 1000 gal low pressure tank. A week of station operation produces in this tank 950 gallons of supernatant water and 50 gallons of primary sewage sludge.

950 gallons - COD of 125 mg/02/liter
50 gallons - COD of 60,000 mg/02/liter)

The supernatant liquor 950 gallons (COD – 125 mg/02/liter) requires 451 g of $O_2$ for oxidation. The effluent from the coke amounts of 43 gallons (COD 7200 mg/02/liter) and requires 1184 grams of $O_2$ for oxidation. Thus the oxidation requirement for both streams passing to the rooftop storage of recycle water is 1636 grams of oxygen or 3.6 pounds pf oxygen. Hydrogen peroxide solutions are marketed (freight equalized basis) at 18¼ cents for a 50% $H_2O_2$ solution and 23 cents/lb. for a 70% $H_2O_2$ solution. This calculates out to a price of 70 cents/lb/active oxygen for the 70% solution or 79 cents/lb/active oxygen for the 50% solution. Thus to supply the oxygen requirement for the liquid in the rooftop tank from $H_2O_2$ solutions a chemical charge (per 1000 gals waste) of $2.50 to $2.70 would have to be made to pump in some 15.3 lbs. of 50% hydrogen peroxide or 11 lbs. of 70% $H_2O_2$.

Going now to handling the settle primary sludge (50 gallons) this can be done overnight when the station is not busy. Allowing five hours to coke the accumulated sludge requires feeding some 2/3 quart of sludge to the heater per minute. A coil sized to heat sludge to coking temperature and provide 1 minute residence time at this temperature is of moderate size for the indicated charge rate. The separator vessel can be relatively small since the coke separates readily, in fact, some 50–60 lbs of wet coke can be blown down over the 5 hour interval. This charge which contains some 7 pounds of solids and the rest sterile water can be blown into pit and the solids allowed to dry. Finally, the solids can be disposed of as landfill or soil conditioner.

As an alternative to the described arrangement the primary settling tank and coking facilities can be located in an undeground pit. This will provide for recycle of water from the rooftop storage tank for flushing the urinals and toilets. Fresh water can be piped in for the wash basins. The water in the rooftop storage will be water white and have no odor.

If a very slight excess of $H_2O_2$ is used, the toilets and urinals will be self cleaning and excess of water over that needed for the urinals and toilets will be available since the water from the wash basins is continuously added. This excess water can be used for washing down the restroom floors, station floor etc. If the residual peroxide content of the water in the rooftop tank is kept low enough, the water additionally can serve for fire protection through a sprinkler system and thereby reduce insurance rates.

It will be obvious to those skilled in the art that various changes can be made in the described invention without departing from the scope thereof and therefore the invention is not limited by that which is illustrated in the drawing and described in the specification but only as indicated in the appended claims.

What is claimed is:

1. A process for treating aqueous waste sewage comprising conveying said sewage to a primary settling zone; separating liquid from solid wastes; flowing said liquid to a water storage and treating zone and synchronously supplying hydrogen peroxide to said liquid, coking said solid waste under a pressue of about 500 to 3000 psig at a temperature between about 550°F and 750°F to form coke and a liquid effluent; separating said coke from said effluent; recycling said effluent to said water storage and treating zone and periodically treating said effluent with hydrogen peroxide as said effluent passes to said zone.

2. The process of claim 1 wherein said hydrogen peroxide is in solution form at a concentration of 50 to 70 per cent.

* * * * *